United States Patent [19]
Tull et al.

[11] 3,870,753
[45] Mar. 11, 1975

[54] PROCESS FOR PREPARING INDENYL ACETIC ACIDS

[75] Inventors: Roger J. Tull, Metuchen; Robert F. Czaja, Scotch Plains; Richard F. Shuman, Westfield; Seemon H. Pines, Murray Hill, all of N.J.

[73] Assignee: Merck & Co., Inc., Rahway, N.J.

[22] Filed: Dec. 20, 1973

[21] Appl. No.: 426,864

[52] U.S. Cl. ............ 260/515 A, 260/516, 260/590, 260/606.5 P, 260/607 A, 260/609 E
[51] Int. Cl. ........................................ C07c 147/00
[58] Field of Search ................ 260/470, 515 A, 516

[56] References Cited
UNITED STATES PATENTS
3,732,292   5/1973   Hinkley et al. ............... 260/515

*Primary Examiner*—James A. Patten
*Attorney, Agent, or Firm*—Mario A. Monaco; Harry E. Westlake, Jr.

[57] ABSTRACT

Process for preparing 5-fluoro-2-methyl-1-(p-methylsulfinylbenzylidene)-3-indenyl acetic acid by reacting 5-fluoro-2-methyl-1-(p-methylthiobenzyl) or (p-methylsulfinylbenzyl)-indene with a glyoxylic acid.

6 Claims, No Drawings

PROCESS FOR PREPARING INDENYL ACETIC ACIDS

This invention relates to a new process for preparing 5-fluoro-2-methyl-1-(p-methylsulfinylbenzylidene)-3-indenyl acetic acid and to intermediates thereof.

BACKGROUND OF THE INVENTION

The above-mentioned 3-indenyl acetic acid is a known compound having anti-inflammatory activity, as described in U.S. Pat. No. 3,654,349. The compound has been prepared by a number of methods as disclosed in the above-mentioned patent as well as Greek Pat. No. 41,736. In one of the methods described in the Greek patent, 5-fluoro-2-methyl-1-(p-methylsulfinylbenzyl)-indene is disclosed as an intermediate. This intermediate is reacted with a glycolic acid ester and the product is subsequently oxidized to the ester of 5-fluoro-2-methyl-1-(p-methylsulfinylbenzyl)-indenylidene-3-acetic acid which is then isomerized and hydrolyzed to achieve the desired compound.

It is an object of this invention to provide a new process for preparing 5-fluoro-2-methyl-1-(p-methylsulfinylbenzylidene)-3-indenyl acetic acid. It is a further object to prepare this compound via a new process which is advantageous over the process described above.

DETAILS OF THE INVENTION

In accordance with one aspect of this invention, it has been found that the subject compound can be readily prepared by a combination of reaction steps; namely, by reacting 5-fluoro-2-methyl-1-(p-methylthiobenzyl)-indene with glyoxylic acid to form 5-fluoro-2-methyl-1-(p-methylthiobenzyl)-indenylidene-3-acetic acid, which compound is then isomerized and subsequently oxidized to yield the desired product. Alternatively, the indenylidene-3-acetic acid compound may be first oxidized and then isomerized. In another aspect of this invention, 5-fluoro-2-methyl-1-(p-methylsulfinylbenzyl)-indene is reacted with glyoxylic acid to form directly 5-fluoro-2-methyl-1-(p-methylsulfinylbenzyl)-indenylidene-3-acetic acid, which compound is subsequently isomerized to the desired product. The 5-fluoro-2-methyl-1-(p-methylsulfinyl [or methylthio]benzyl-indenylidene-3-acetic acids are novel compounds and make up another aspect of this invention. These compounds are useful as intermediates for the preparation of 5-fluoro-2methyl-1-(p-methylsulfinylbenzylidene)-indene-3-acetic acid, as well as final products, as it has been found that they similarly possess anti-inflammatory activity and could be useful for the same purpose as described for the final product of this process.

More specifically, the condensation reaction between the 5-fluoro-2-methyl-1-(p-methylthio[or methylsulfinyl]benzyl)-indene and glyoxylic acid is carried out in the presence of a strong base. Accordingly, bases such as alkali and alkali earth hydroxides (NaOH, KOH) especially in the presence of a quaternary ammonium halide as catalyst (such as $C_{1-6}$ trialkylbenzyl ammonium halide or tetra $C_{1-6}$ alkyl ammonium halide, i.e., 0.1 to 1.0 mole halide to hydroxide), alkali or alkali earth $C_{1-5}$ alkoxide (NaOCH$_3$, K-tertbutoxide), tetra $C_{1-6}$ alkyl ammonium halide or benzyl tri-$C_{1-5}$-alkyl ammonium hydroxides (benzyltrimethyl ammonium hydroxide) [Trition B] may be used. Preferably, trialkylbenzyl ammonium hydroxide or tetra-alkyl ammonium hydroxide is used as the strong base. The reaction can be carried out without a solvent, but preferably a solvent is used which is either added to the reaction mixture or employed in conjunction with the strong base. $C_{1-5}$ alkanols (methanol, butanol), aromatic solvents such as benzene, and toluene, dioxane, acetonitrile, pyridine, dimethylformamide, triglyme, dimethylsulfoxide, water and mixtures of water and organic solvents may be employed. In fact, any solvent in which the indene and glyoxylic acid are sufficiently soluble can be employed. Preferably, the solvent is $C_{1-5}$ alkanol especially methanol. The mole ratio of base to glyoxylic acid should be at least slightly more than one mole to one, but preferably about 1.1 to about 4.0 moles of base to glyoxylic acid and especially 1.2 to 2.5. The mole ratio of glyoxylic acid to indene is not critical and may conveniently be from about 1 to 3.0 moles to one and preferably about 1.5 to 1.0 moles of indene. Alternatively, one may use the alkali or alkali earth salt or aryl or alkyl ester, especially $C_{1-5}$ alkyl, i.e., methyl, ethyl, butyl in place of the glyoxylic free acid or any other acid salt of a strong base, as the starting material. Under these circumstances, the amount of strong base employed in the reaction with glyoxylic acid salt or ester need be no more than a catalytic amount, although the ratio indicated above may also be employed. The order of addition of the reactants is not critical; however, it is preferred to add the glyoxylic acid compound to the reaction mixture of indene and base. The time of reaction is not critical, the reaction being carried out until substantial completion. Preferably, however, the reaction is carried out from 15 minutes to about 5 hours and especially from about ½ to 3 hours. The reaction may be carried out from about 0°C to about 150°C, preferably from about 10°C to 80°C and especially from 35°C to 60°C.

After the condensation reaction is complete, the isomerization of the thus formed 5-fluoro-2-methyl-1-(p-methylthio[or methylsulfinyl]benzyl)-indenylidene-3-acetic acid, in the form of its acid addition salt or ester, may be carried out without isolation; that is, the same reaction mixture from the glyoxylic acid reaction can be used for the isomerization. This is particularly true when one desires to carry out the isomerization under basic conditions, since the reaction mixture from the previous step is already basic and merely continued reaction will lead to the isomerized product. On the other hand, one may wish to use other strong bases for the isomerization. Such bases as those described for the previous reaction may be employed. Preferably, however, the isomerization is carried out with the use of acid, and accordingly the reaction product from the previous step is preferably first isolated. Various organic and/or inorganic acids may be employed such as $C_{1-5}$ alkylsulfonic acids (methanesulfonic), arylsulfonic acids (toluene sulfonic acid), acidic ion exchange resins (i.e., Dowex 50), arylcarboxylic acids (p-nitrobenzoic acid), aliphatic acids (alkanoic acids such as acetic acid, propionic acid, trichloroacetic acid and trifluoroacetic acid), mineral acids (phosphoric acid, hydrochloric acid, hydrobromic acid and sulfuric acid), but preferably mineral acids or mixtures of mineral acids and organic acids (preferably $C_{2-5}$ alkanoic acids) such as hydrochloric and acetic acid, hydrobromic and propionic acid are employed. The ratio of acid to indenylidene is not critical and one may therefore suitably use catalytic quantities of acid. All that is necessary is that the reaction mixture be made acid in the event that it may be basic. It is preferred, however, to use about 0.1 to 50 moles of acid to indenylidene and especially 1.0 to 20. The reaction may be carried out with or without a solvent, and when solvents are employed those previously mentioned for the glyoxylic acid reaction, which are inert, may be used. In addition, halogenated hydrocarbons such as ethylene dichloride or halobenzenes may be used as solvents. preferably, the reaction is carried out with an acid solvent. The acid solvent may be used as the isomerization agent as well. However, when a weak acid is employed as solvent it is preferred to also employ a strong acid for such as the arylsulfonic acids or mineral acids. Under the most preferred conditions, one would use the unsubstituted alkanoic acids (i.e., acetic acid) as solvent and the arylsulfonic (toluenesulfonic acid) and especially mineral acids (i.e., hydrochloric acid). The time and temperature of reaction is not critical, the higher the temperature the shorter the reaction time needed to substantially complete the reaction. Accordingly, the reaction may be carried out at a temperature of about 0°C to about 150°C and preferably from about 50°C to 110°C. Similarly, the reaction time is preferably at least 30 minutes and may be up to one or more days. After completion of the isomerization reaction, the product may be isolated by standard techniques such as filtration, extraction or removal of the acid solvent by evaporation.

When one uses the p-methylthio compound as the starting material, oxidation of the methylthio group to the desired methylsulfinyl group may be carried out at any stage of the reaction process such as immediately after reaction with glyoxylic acid or after isomerization, but preferably after isomerization. The oxidation may be carried out by any number of standard techniques such as oxidation with $H_2O_2$, basic periodates or hypohalites, preferably the alkaline or alkaline earth periodates and hypohalites or organic peracids such as peracetic acid and monoperphthalic acid. Preferably, however, the oxidizing agent is $H_2O_2$. The reaction is preferably carried out in the presence of a solvent. For such purposes $C_{1-5}$ alkanoic acids (acetic acid), halogenated hydrocarbons (chloroform), ethers (dioxane), $C_{1-5}$ alkanols (isopropanol) or mixtures thereof may be used.

The mole ratio of oxidizing agent to indene compound may be from 0.5 to 10 but preferably from .8 to 1.5. The reaction time and temperature are not critical, the reaction being carried out until substantial completion. Preferably, however, the time of reaction is from 1 to 18 hours and especially 2 to 6 hours at a temperature of 10°C to 80°C and especially 25°C to 50°C.

In the event that one desires to use an ester of glyoxylic acid in the first step, the final free acid compound iis readily obtained during the isomerization especially if some water is present and when the isomerization is carried out at elevated temperatures.

The starting 5-fluoro-2-methyl-1-(p-methylthio [or methylsulfinyl]benzyl)-indene may be prepared by the condensation of 5-fluoro-2-methyl-1-indanone with a p-methylthio (or p-methylsulfinyl) benzyl compound under Grignard or Whittig type conditions. The starting material is substantially 5-fluoro-2-methyl-1-(p-methylthio[or methylsulfinyl]benzyl)-indene, wherein the double bond is in the 1 to 2 position. However, under certain conditions in its formation some of the tautomeric indene compounds are present. When these isomers are reacted in the presence of a base as in the subsequent reaction with glyoxylic acid, the same indenyl anion is formed which reacts with glyoxylic acid in the same way, giving the indenylidene compound. For example, the Grignard of p-methylthio benzyl chloride or the Whittig reagent of p-methylsulfinyl benzyl triphenylphosphonium chloride is reacted with 5-fluoro-2-methyl-1-indanone under Grignard or Whittig conditions, respectively. In the case of the Grignard reaction, the benzyl indene compound is obtained directly, whereas with the Whittig reaction, the benzylidene indane compound is obtained. In this latter case, the benzylidene is isomerized to the benzyl compound under acid conditions by well known means for isomerization. The 5-fluoro-2-methyl-1-indanone, in turn, may be prepared by reaction of 3-nitrobenzaldehyde with an alkali propionate to form α-methyl-3-nitrocinnamic acid, which compound is hydrogenated followed by fluorination to give α-methyl-3-fluoro hydrocinnamic acid which latter compound may be ring closed with polyphosphoric acid to form the indanone.

The following examples are given by way of illustration.

EXAMPLE 1

α-Methyl-3-fluorocinnamic acid

A mixture of 49.6 grams (0.4 moles) of meta fluorobenzaldehyde,"66 ml. (0.51 moles) of propionic anhydride and 38.4 grams (0.4 moles) of sodium propionate were heated at 135°C for 19 hours. The reaction was cooled and to it was added a liter of 1 normal potassium hydroxide and the mixture was extracted with ether. The aqueous phase was freed of residual ether and acidified to pH 2 with hydrochloric acid. The product which crystallized was filtered and dried to give 51.5 grams of α-methyl-3-fluorocinnamic acid, melting point 95° to 97°C.

EXAMPLE 2

α-Methyl-3-fluorohydrocinnamic acid 15.6 Grams of the above product from Example 1 was hydrogenated at 40 pounds per square inch in 800 ml. of methanol with 3 grams of platinum oxide catalyst. After the theoretical uptake of hydrogen, the hydrogenation was stopped. The catalyst was removed by filtration and the solvent removed in vacuo giving a theoretical yield of the desired product, α-methyl-3-fluorohydrocinnamic acid, which did not crystallize.

EXAMPLE 3

5-Fluoro-2-methyl-1-indanone

The product of Example 2 is heated with 10 times its weight of polyphosphoric acid at 80°–90°C for 2 hours. The liquid is poured into 1.1 of ice water, stirred for one-half hour and extracted with three 100 ml. portions of ether. The combined extracts are washed with water and sodium bicarbonate solution until the ether phase is neutral, after which the extract is dried over sodium sulfate and concentrated to leave 5-fluoro-2-methyl-1-indanone as a yellowish oil, b.p. 60°C/0.15 mm.

EXAMPLE 4

5-Fluoro-2-methyl-1-(p-methylthiobenzyl)-indene 13.44 Grams (0.56 mole) of magnesium turnings were placed in a dried flask under $N_2$ with 125 ml. of ether and a crystal of iodine. Six ml. of 65 ml. solution of 24.2 g. (0.14 mole) of p-methylthiobenzyl chloride in ether was added. After 3 to 5 minutes of stirring the iodine color disappeared and the reaction began. After aging for 5 minutes, the rest of the benzyl chloride was added dropwise over 45 minutes. It was rinsed in with 10 ml. of ether and the reaction aged for 2 hours with stirring. 21 Grams (0.128 mole) of 5-fluoro-2-methyl-1-indanone dissolved in 50 ml. of ether was added dropwise over 30 minutes. After aging for 1 hour, the milky supernatent mixture was decanted from the magnesium into 100 ml. of acetic acid. The flask and residual magnesium were rinsed into the acid solution with 4 × 50 ml. of benzene. Two hundred ml. of water were added, the layers were separated and the organic layer was washed with 5 × 200 ml. water. It was stripped to dryness after drying over $Na_2SO_4$. The crude reaction product is crystallized from hexane to give pure 5-fluoro-2-methyl-1-(p-methylthiobenzyl)-indene, melting point 58°–59°C.

EXAMPLE 5 p-Methylthiobenzyltriphenylphosphonium chloride 17.3 g. of p-methylthiobenzyl chloride is added to 28 g. of triphenylphosphine in 80 ml. of benzene. The reaction was heated for 4 hours, then cooled and the product, p-methylthiobenzyl triphenylphosphonium chloride, was collected by filtration. There was obtained 19 g., melting point 257°–258°C.

In a similar manner, when p-methylsulfinylbenzyl chloride is used, the product is p-methylsulfinylbenzyl triphenylphosphonium chloride, melting point 258°–262°C with gasing.

EXAMPLE 6

5-Fluoro-2-methyl-1-(p-methylthiobenzyl)-indene
A. 5-Fluoro-2-methyl-1-(p-methylthiobenzylidene)-indane 169 mg. (1.5 mm.) of potassium t-butoxide was dissolved in 2 ml. of DMSO and treated with 651 mg. (1.5 mm.) of p-methylthiobenzyl triphenylphosphonium chloride dissolved in 1 ml. of DMSO. To this solution was added 270 mg. (1.65 mm.) of 5-fluoro-2-methyl-1-indanone in 2 ml. of DMSO. The solution was heated at 75°C for 15.5 hours. Benzene and water were added and the benzene layer was washed five times with water. The benzene layer was dried over $Na_2SO_4$ and evaporated to dryness under vacuum. The weight was 915.6 mg. This material was eluted through 8 g. of silica gel with benzene to remove triphenylphosphine oxide. The eluate weighed 372 mg. after removal of solvent. This was rechromatographed through 15 g. of silica gel using hexane and 95.9 mg. of 5-fluoro-2-methyl-1-(p-methylthiobenzylidene)-indane was isolated, melting point 67°–70°C.

B. 5-Fluoro-2-methyl-1-(p-methylthiobenzyl)-indene 50 mg. of the benzylidene compound from A above is mixed with 1 ml. of acetic acid containing 100 mg. of sulfuric acid and the reaction mixture stirred for 1 hour at room temperature. The mixture is then diluted with water and extracted with ether. The ether extract is concentrated in vacuo to give the subject compound.

Similarly, when the p-methylsulfinylbenzyl triphenylphosphonium chloride is used, the corresponding p-methylsulfinylbenzyl indene compound is obtained.

EXAMPLE 7

5-Fluoro-2-methyl-(1-p-methylsulfinylbenzyl)-indene 500 mg. (1.755 mm.) of 5-fluoro-2-methyl-1-(p-methylthiobenzyl)-indene is dissolved in 5 ml. of chloroform. To this solution is added 30% hydrogen peroxide (equivalent to 2.645 mm.). The reaction mixture is aged for one hour at room temperature followed by the addition of 5 ml. of glacial acetic acid and aged for an additional hour. The reaction mixture is then diluted with 25 ml. of 1:1 benzeneether and extracted with 6 × 25 ml. of 3% aqueous sodium chloride. The solution is then dried over sodium sulfate and evaporated in vacuo to yield an oil. Recrystallization from ice-cold isopropanol gives a product with a melting point of 92°–93°C.

EXAMPLE 8

5-Fluoro-2-methyl-1-(p-methylthiobenzyl)-indenylidene-3-acetic acid

To 41.8 g. (147 mmoles) of the preceeding indene (from Example 4) is added 150 ml. of methanolic Triton B solution (53.2 g., dry basis; 317.5 mmole) and the batch, under a nitrogen atmosphere, is brought to 45°C. 14.63 g. glyoxylic acid (198 mmole) is added and the batch, which warms to 65°C, is brought back to 50°C and aged one hour. It is then diluted with 250 ml. of water and acidified with dilute sulfuric acid. The product obtained in 90% yield is recrystallized to give the pure subject product, melting point 185.5° to 188°C.

When sodium hydroxide and tetramethyl ammonium chloride or tetramethyl ammonium hydroxide is used in place of Triton B in the above example, the idenylidene-3-acetic acid is obtained.

EXAMPLE 9

5-Fluoro-2-methyl-1-(p-methylthiobenzylidene)-indenyl-3-acetic acid

A suspension of 34.2 g. of 5-fluoro-2-methyl-1-(p-methylthiobenzyl)-indenylidene-3-acetic acid (from Example 8) in 342 ml. of glacial acetic acid and 137 ml. of concentrated HCl was stirred under a nitrogen atmosphere at 90°C for 10 hours. The reaction was cooled over 2–3 hours to room temperature and aged an additional 3 hours at 20°–25°C. The batch was filtered, washed with 70:30 acetic acid-water (ca. 100 ml.) then water-washed to remove excess acid. There was obtained 93% of product, melting point 180°–183°C.

EXAMPLE 10

5-Fluoro-2-methyl-1-(p-methylsulfinylbenzylidene)-indenyl-3-acetic acid

Seventeen grams (50 mmole) of the product from Example 9 is stirred in 175 ml. of chloroform and 57 ml. of acetic acid under nitrogen and the temperature brought to 30°C. To this slurry is added 5.5 ml. of 9.6 N aqueous $H_2O_2$ (30%) (52.8 mmole) over one minute. The temperature is allowed to rise to 38°–40°C, then recooled over a half-hour period to 35°C. The batch is aged a total of 6.5 hours, maintaining 35°C internal temperature. After the age period, 175 ml. of water is added and the $CHCL_3$ layer concentrated to a small volume in vacuo. The residue is crystallized from 130 ml. of ethanol and the slurry aged 1.5 hours at 20°–25°C. The product is filtered and washed with 30 ml. of 2BA ethanol and dried in vacuo at 80°C. The product weighs 15.3 g. (86 %), melting point 183°–185°C.

Similarly when sodium periodate or potassium hypochlorite is used in place of hydrogen peroxide in the above example, there is obtained the desired compound.

What is claimed is:

1. A process for preparing 5-fluoro-2-methyl-1-(p-methylsulfinylbenzylidene)-3-indenyl acetic acid or its acid addition salt which comprises the steps of:
   a. condensing in the presence of a base 5-fluoro-2-methyl-1-$R_1$-benzylindene, wherein $R_1$ is p-methylthio or p-methylsulfinyl with glyoxylic acid, its salt or ester, to form the corresponding 5-fluoro-2-methyl-1-(p-methylthio[or methylsulfinyl]benzyl)-indenylidene-3-acetic acid, salt or ester; and
   b. isomerizing said indenylidene compound in the presence of a base or acid to form the desired indenyl-3-acetic acid compound when $R_1$ is p-methylsulfinyl; when $R_1$ is methylthio, isomerizing said indenylidene-3-acetic acid from Step (a) to form 5-fluoro-2-methyl-1-p-methylthiobenzylidene-3-indenyl acetic acid and subsequently oxidizing said 3-indenyl acetic acid or alternatively first oxidizing said 3-indenylidene acetic acid to form the corresponding 1-p-methylsulfinyl compound and subsequently isomerizing said 1-p-methylsulfinyl compound.

2. The process of claim 1 wherein $R_1$ is p-methylthio.

3. The process of claim 1 wherein $R_1$ is p-methylsulfinyl.

4. A process for preparing 5-fluoro-2-methyl-1-(p-methylsulfinylbenzylidene)-indenyl-3-acetic acid which comprises the steps of:
   a. condensing in the presence of a base 5-fluoro-2-methyl-1-(p-methylthiobenzyl)-indene with glyoxylic acid, its salt or ester to form the corresponding 3-indenylidene acetic acid compound;
   b. isomerizing said 3-indenylidene acetic acid compound in the presence of a base or acid to form the 5-fluoro-2-methyl-1-(p-methylthiobenzylidene)-indenyl-3-acetic acid compound; and
   c. oxidizing said indenyl-3-acetic acid compound to the desired product.

5. The process of claim 4 wherein glyoxylic acid is used.

6. The process of claim 5 wherein the isomerization is carried out in the presence of an acid.

* * * * *